(12) United States Patent
Gayl

(10) Patent No.: US 12,031,823 B2
(45) Date of Patent: Jul. 9, 2024

(54) INERTIAL NAVIGATION SYSTEM OF SYSTEMS (INSOS)

(71) Applicant: Franz J. Gayl, Burke, VA (US)

(72) Inventor: Franz J. Gayl, Burke, VA (US)

(*) Notice: Subject to any disclaimer, the term of this patent is extended or adjusted under 35 U.S.C. 154(b) by 521 days.

(21) Appl. No.: 17/223,446

(22) Filed: Apr. 6, 2021

(65) Prior Publication Data
US 2022/0316884 A1 Oct. 6, 2022

(51) Int. Cl.
*G01C 21/16* (2006.01)
*G01C 21/18* (2006.01)

(52) U.S. Cl.
CPC ........... *G01C 21/165* (2013.01); *G01C 21/18* (2013.01)

(58) Field of Classification Search
CPC .. G01C 21/165; G01C 21/18; G01C 19/5783; G01C 21/16
See application file for complete search history.

(56) References Cited

U.S. PATENT DOCUMENTS

| 10,092,850 | B1* | 10/2018 | Smoot | A63B 43/00 |
| 2016/0047675 | A1* | 2/2016 | Tanenhaus | G01C 25/005 |
| | | | | 702/104 |
| 2018/0024635 | A1* | 1/2018 | Kaifosh | G06F 3/017 |
| | | | | 345/156 |
| 2019/0064364 | A1* | 2/2019 | Boysel | G05D 1/027 |
| 2019/0219395 | A1* | 7/2019 | Fox | G01C 19/5783 |
| 2020/0309531 | A1* | 10/2020 | Cui | G01S 5/0289 |
| 2021/0145608 | A1* | 5/2021 | Herr | A61B 8/0825 |

FOREIGN PATENT DOCUMENTS

CN 109827593 A * 5/2019

* cited by examiner

*Primary Examiner* — Lisa M Caputo
*Assistant Examiner* — Cynthia L Davis
(74) *Attorney, Agent, or Firm* — Maier & Maier, PLLC

(57) ABSTRACT

A system and apparatus for identifying a position based on multiple inertial measurement units (IMU). An exemplary embodiment may include multiple IMUs fixed to a support surface which houses a control unit. The IMUs may be arranged in opposing pairs in order to identify and cancel out the bias or error of each individual IMU. The control unit may employ parallel processing and an AI system to calculate an accurate position based on measurement data from the IMUs.

12 Claims, 13 Drawing Sheets

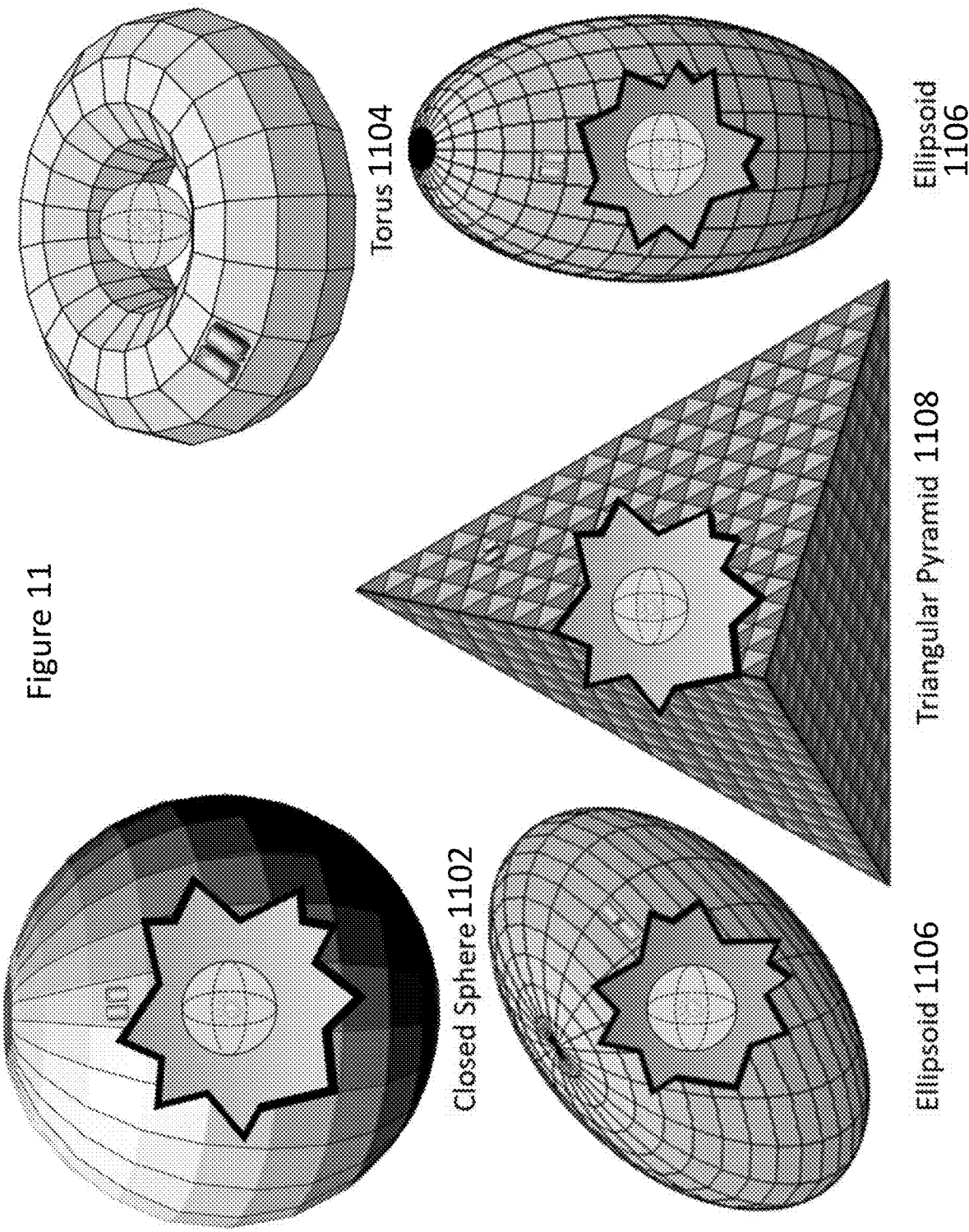

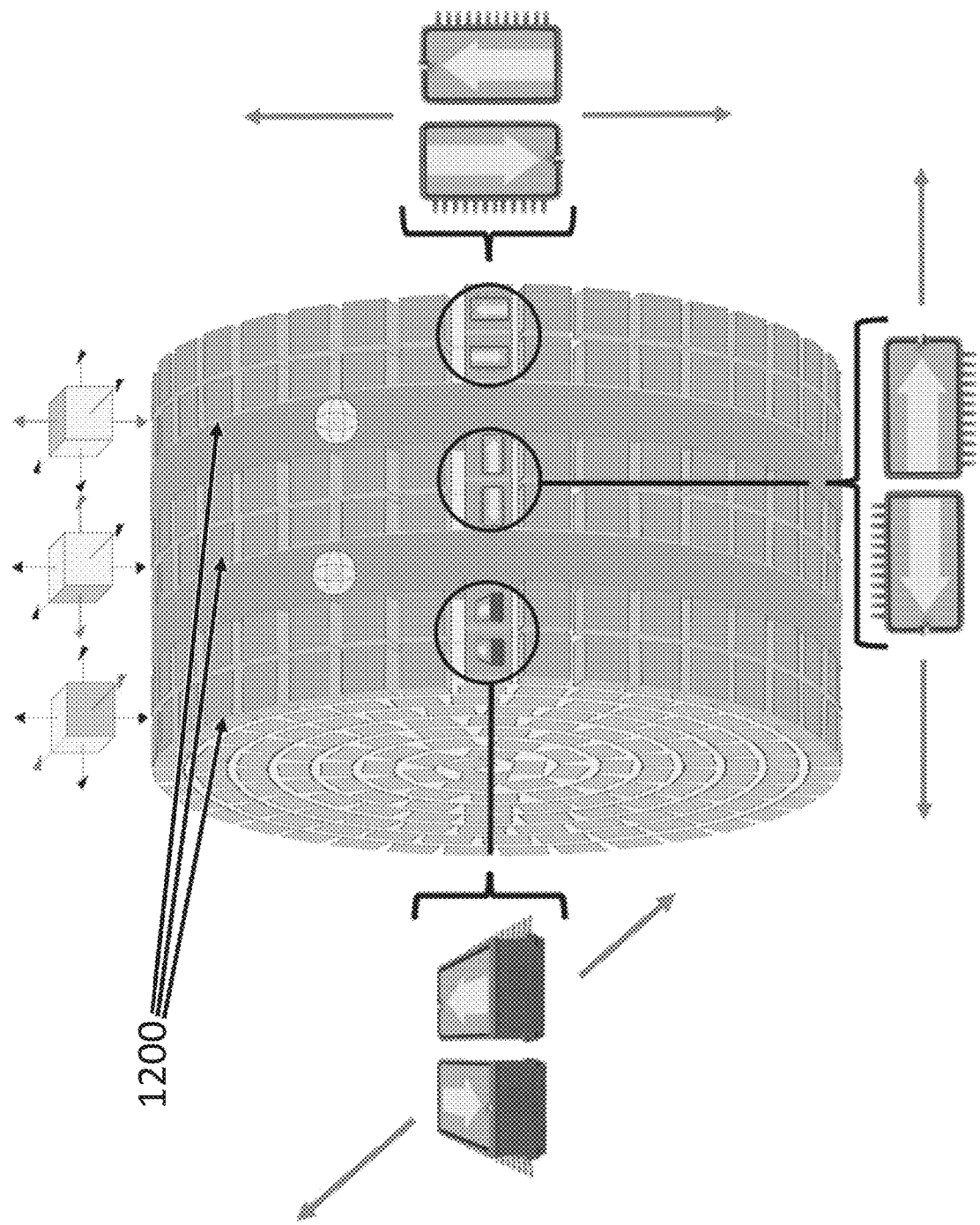

INERTIAL NAVIGATION SYSTEM OF SYSTEMS (INSOS)

FIELD

An exemplary embodiment may relate to the field of inertial navigation systems.

BACKGROUND

Inertial Navigation Systems (INS) are self-contained navigation devices that require no external signals or sensor observations. INS measurements are provided by internal accelerometers and rate-gyroscopes that track the position and orientation of the platform on which they are hosted relative to a known starting point, orientation, and velocity. INS technologies are either conventional mechanical, solid state, or micro-machined electromechanical systems (MEMS).

INS may typically correspond to one of two frames of reference in which their rate-gyros and accelerometers operate: (1) The global frame of reference may be used when an INS is free to maintain constant orientation within the three-dimensional space through which a relatively stable host platform is navigating. (2) The body frame of reference may be used when an INS is rigidly strapped down to an unstable host platform. Thus, a typical INS either measures inertial changes in the body or global changes within a global frame of reference.

Mechanical INS may be employed aboard stable host platforms where the mechanical INS holds itself in alignment with the global frame of reference. Mechanical INS may combine gyroscopes that are free to move in the x, y, and z axes using the gimbals (frames) which isolate them from external rotational forces. The gyroscopes may be complemented with conventional accelerometers for velocity measurements. Mechanical INS are typically mechanically complex, larger, heavier, and more expensive than their counterparts, but are also computationally simple and can be more accurate and are thus often implemented in stable platforms.

Solid state and MEMS INS may be implemented aboard unstable platforms. An Inertial Measurement Unit (IMU) may be rigidly strapped down to the unstable host platform, causing it to experience rotational forces precisely faithful to the motion of the host platform in the body frame of reference. IMUs typically contain three mutually orthogonal rate-gyroscopes and three orthogonal accelerometers measuring angular velocity and linear acceleration, respectively. By processing signals from these rigidly connected devices, the instantaneous position and orientation of the IMU and host platform are tracked. IMUs may require greater computational complexity, but benefit from their smaller size, lighter weight, reduced mechanical complexity and overall lower unit cost. As the cost of computation has decreased, strap-down IMUs have become the technology of choice for unstable platforms.

INS technology lacks sub-meter position accuracy comparable to GPS and similar Position, Navigation, and Timing (PNT) systems. In the absence of any external reference signals or observations for comparison, the uncorrected average error in position of any INS grows without limit. Amongst INS technologies, solid state and MEMS IMU errors grow more rapidly than in mechanical INS.

SUMMARY

According to at least one exemplary embodiment, a method, system and apparatus for identifying a position based on multiple inertial measurement units (IMU) may be shown and described. An exemplary embodiment may include multiple IMUs fixed to a support surface which houses a control unit. The IMUs may be arranged in opposing pairs in order to identify and cancel out the bias or error of each individual IMU. The control unit may employ parallel processing and an AI system to calculate an accurate position based on measurement data from the IMUs.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 11 is an exemplary schematic illustrating several exemplary embodiments with various support surfaces.

FIG. 12 is an exemplary embodiment with spiral support surfaces.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment may provide an Inertial Navigation System of Systems (INSoS) device. Any closed-loop INS technologies may be implemented. For illustrative purposes, an exemplary embodiment may implement MEMS IMUs.

Figure 1:
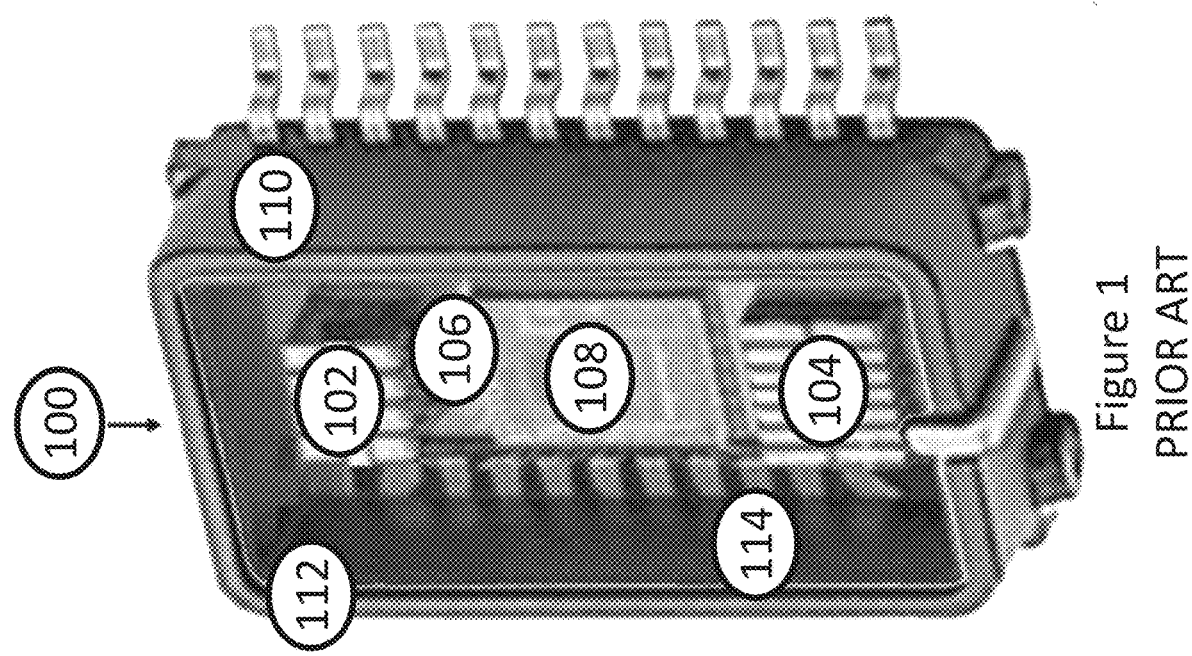
FIG. 1 is an exemplary embodiment of a prior art MEMS IMU.

Referring now to FIG. 1, FIG. 1 may illustrate a prior art commercial MEMS IMU. The MEMS IMU may include an accelerometer sensing element 102, a gyroscopic sensing element 104, gold bond wires and gold played housing pads 106, an application-specific integrated circuit (ASIC) 108 and a pre-molded liquid crystal polymer (LCP) housing 110. The ASIC 108 may be used for temperature compensation, self-diagnostics, and failure detection. The LCP housing 110 may be filled with a gel filling 112 and bonded with a eutectic/die bonding adhesive 114. Finally, an exemplary MEMS IMU may be topped with a grounded stainless-steel lid for electromagnetic compatibility (EMC).

In an exemplary embodiment, error-affected signals are identified and removed by the IMU, and then a position is displayed to the INS user as the calculated position of the IMU and the host platform. Since strapped down MEMS measure the body frame of reference, position and orientation are converted to the global frame of reference during integration.

Errors in MEMS IMUs that lead to orientation errors can have several sources that may corrupt inertial inputs to the rate-gyros and accelerometers corresponding to the IMU. These include constant biases, such as baked-in manufactured characteristics, white noise, and random walk that all conspire to cause a growing drift away from true position and orientation. Localized effects from electromagnetic, gravity, and acoustic field influences can further corrupt INS inertial inputs aggravating any position and orientation inaccuracies of the IMU.

By itself, one IMU may not provide information on error if it cannot be compared to a reference or competing signal. An exemplary embodiment may provide readily available software and parallel processing hardware to calculate the 3-dimensional centroid of a large cluster of individual MEMS IMU position calculations. Multiple IMUs may be geometrically configured, for example, about a sphere, to ensure varied yet balanced x, y, and z orientation to eliminate biases when individual errors are averaged. The averaging and nullification of MEMS IMUs in INSoS begins with IMU pairing.

Multiple MEMS rate-gyros of a single MEMS IMU manufacturer lot produced under the same environmental conditions in the same time frame will likely exhibit similar biases. These identical MEMS IMUs may exhibit similar performance, including similar error trends. If two paired IMUs come from the same lot there is a non-zero probability that the errors of those two IMUs will exhibit similar trends of similar magnitudes in similar 3-dimensional quadrants about the common origin. If two IMUs from the same lot are strapped down in close proximity, they may also be exposed to the same or similar acoustics, electromagnetic and gravitation field effects at any given moment.

Figure 2:
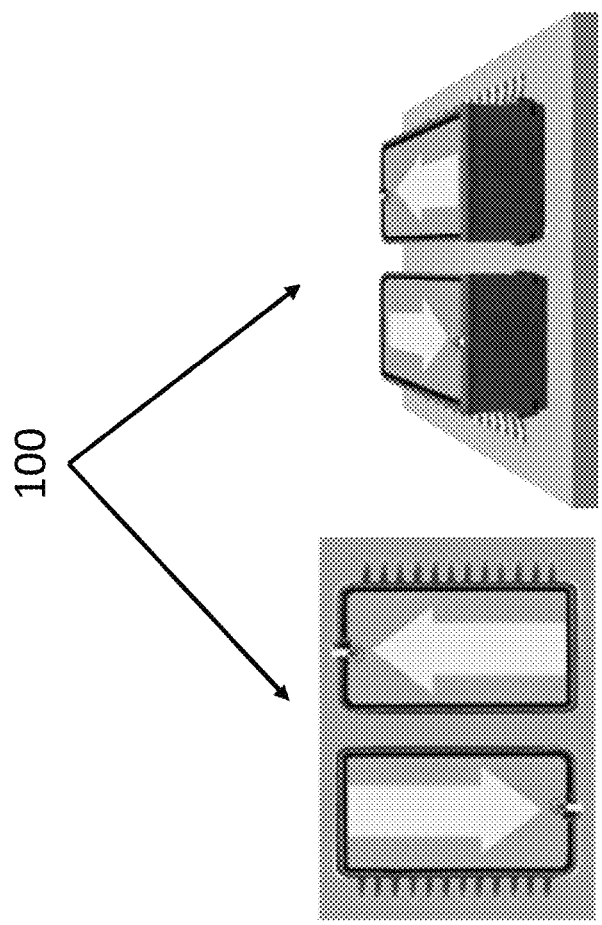
FIG. 2 is an exemplary embodiment of a pair of oppositely oriented IMUs.

The error in IMU-platform position and orientation calculated by an individual IMU may be defined by quantifying its deviation from the body of the embodiment and the platform's true 3-dimensional position at a given moment in time. If the outputs of a pair of effectively identical IMUs from the same lot are integrated in a linear algebra algorithm, their shared biases may exhibit mutual reinforcement. Alternatively, if the same two are physically configured to oppose their pair mate's orientation by 180 degrees in the same plane (as shown in FIG. 2), a mutual cancellation of those shared biases should be expected. Since nullification of errors will lead to more accurate results, cancellation of IMU error properties begins at the level of IMU pairs.

Figure 3:
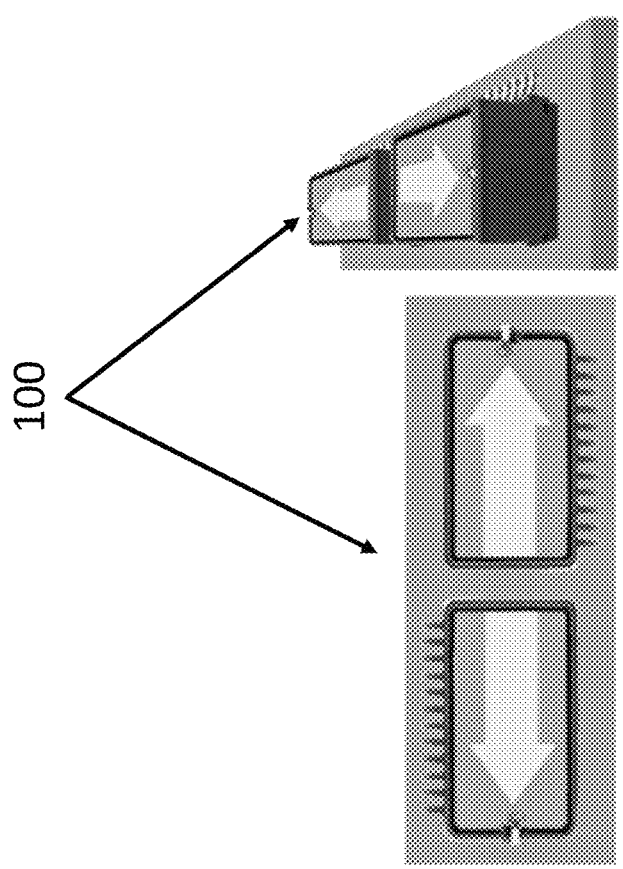
FIG. 3 is an exemplary embodiment of a pair of oppositely oriented IMUs.
Figure 4:
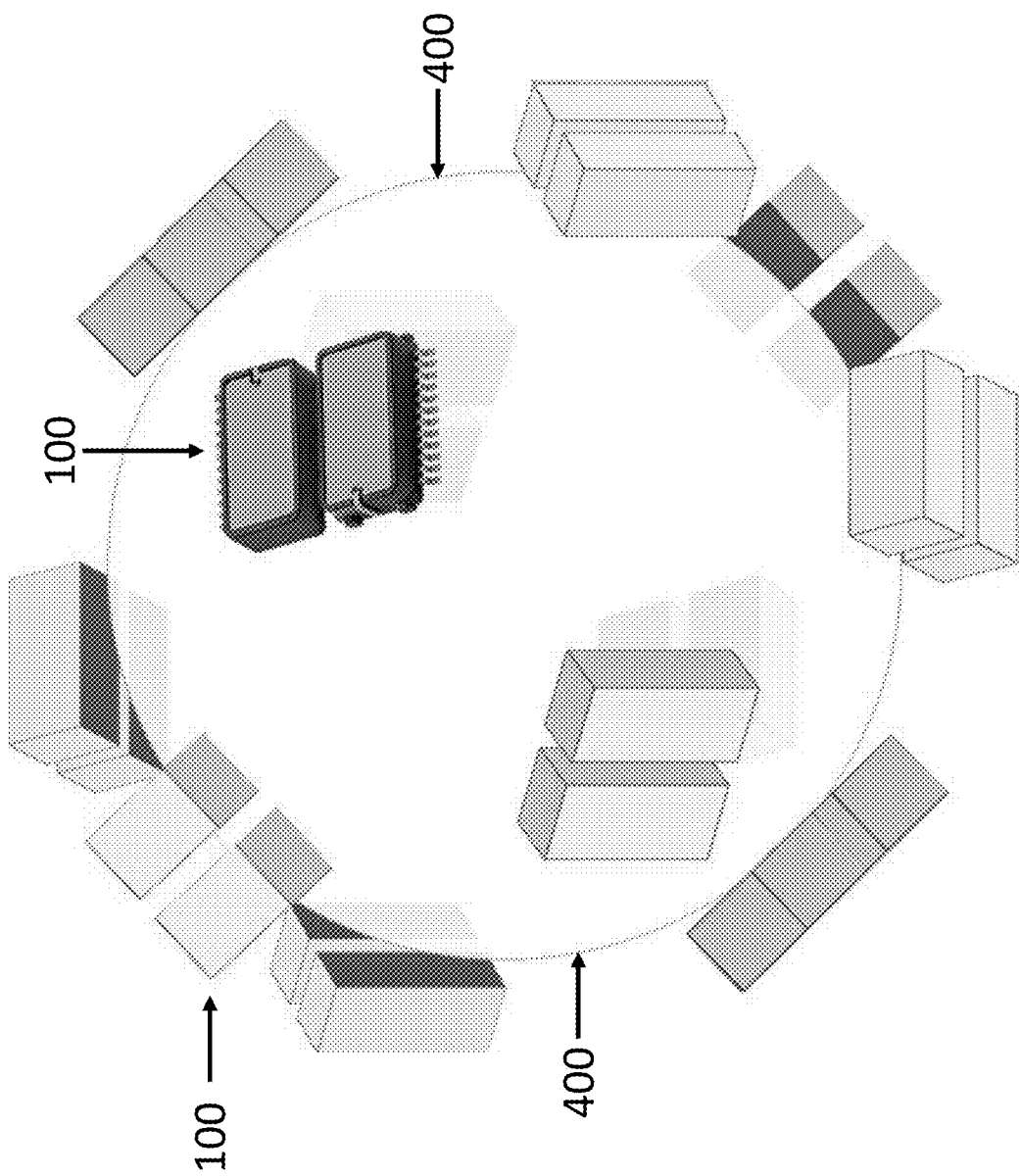
FIG. 4 is an exemplary embodiment of an inertial navigation system with multiple IMUs.

Referring now to the exemplary embodiment in FIG. 2, FIG. 2 may illustrate an exemplary pair of IMUs 100 which are oppositely oriented. The embodiment in FIG. 2 illustrates an opposing side-by-side IMU pairing, whereas an exemplary embodiment illustrated in FIG. 3 is an opposing end-to-end IMU pairing. FIG. 4 illustrates an arrangement of multiple IMU pairs in an exemplary embodiment. As shown in FIG. 4, an exemplary arrangement of IMUs 100 are fixed to a support surface 400. In the exemplary embodiment illustrated in FIG. 4, the support surface is a sphere, but it may be contemplated that any shaped support surface can be implemented. Multiple pairs of IMUs may be placed around the support surface 400. In an exemplary embodiment, the IMUs are regularly distributed about and tangent to the support surface 400, regardless of its shape.

Constant biases from the physical design in an exemplary IMU manufactured lot or batch may be reflected in similar x-y plane errors of any pair of IMUs. Instantaneous bias from local electromagnetic, electrostatic, and acoustic fields affecting the pairs may also be similar. Rotating a localized pair of IMUs about their z axes into a 180-degree opposition may cause bias cancellation in the shared x-y plane, and can be accounted for during AI integration, where the control unit processes and integrates the received signals from the IMUs to identify a position of the device. The integration of paired signals may be the first level of the AI integration. Linear integration of IMU pairs may reveal a centroid in the x-y plane that is closer to the True x-y position. The three-dimensional position of the MEMS IMU pair centroid may be calculated as:

$$\sqrt{(x_1+x_2)^2+(y_1+y_2)^2+(z_1+z_2)^2}$$

The z-axis rate-gyro and accelerometer biases (including bias due to gravity) may be identified and canceled or removed from the data when the AI employs parallel processing to integrate the signals from the IMU pairs at the second level of AI integration.

Figure 5A:
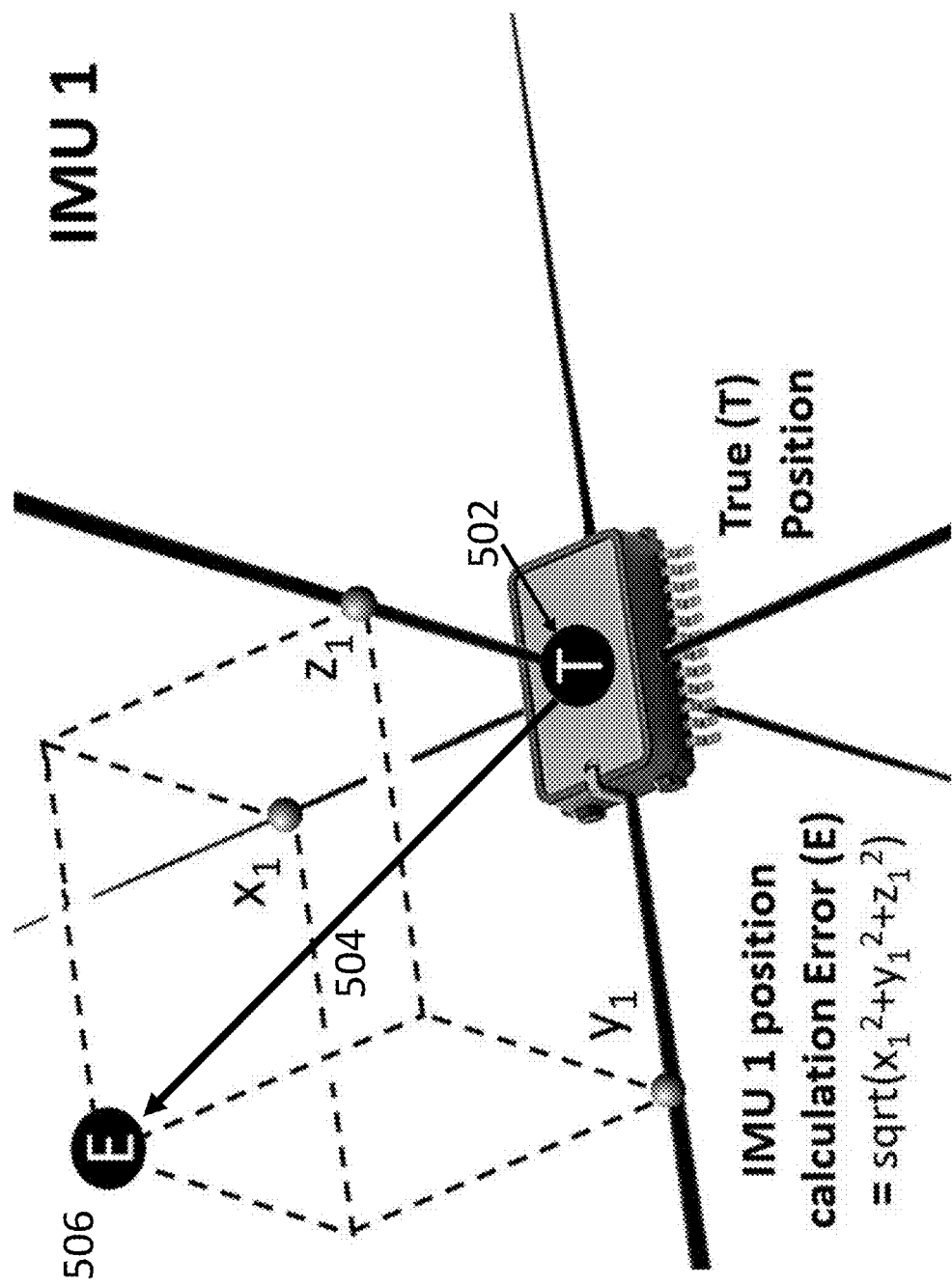
FIG. 5A is an exemplary plot of the error bias of one IMU in a pair of IMUs.
Figure 5B:
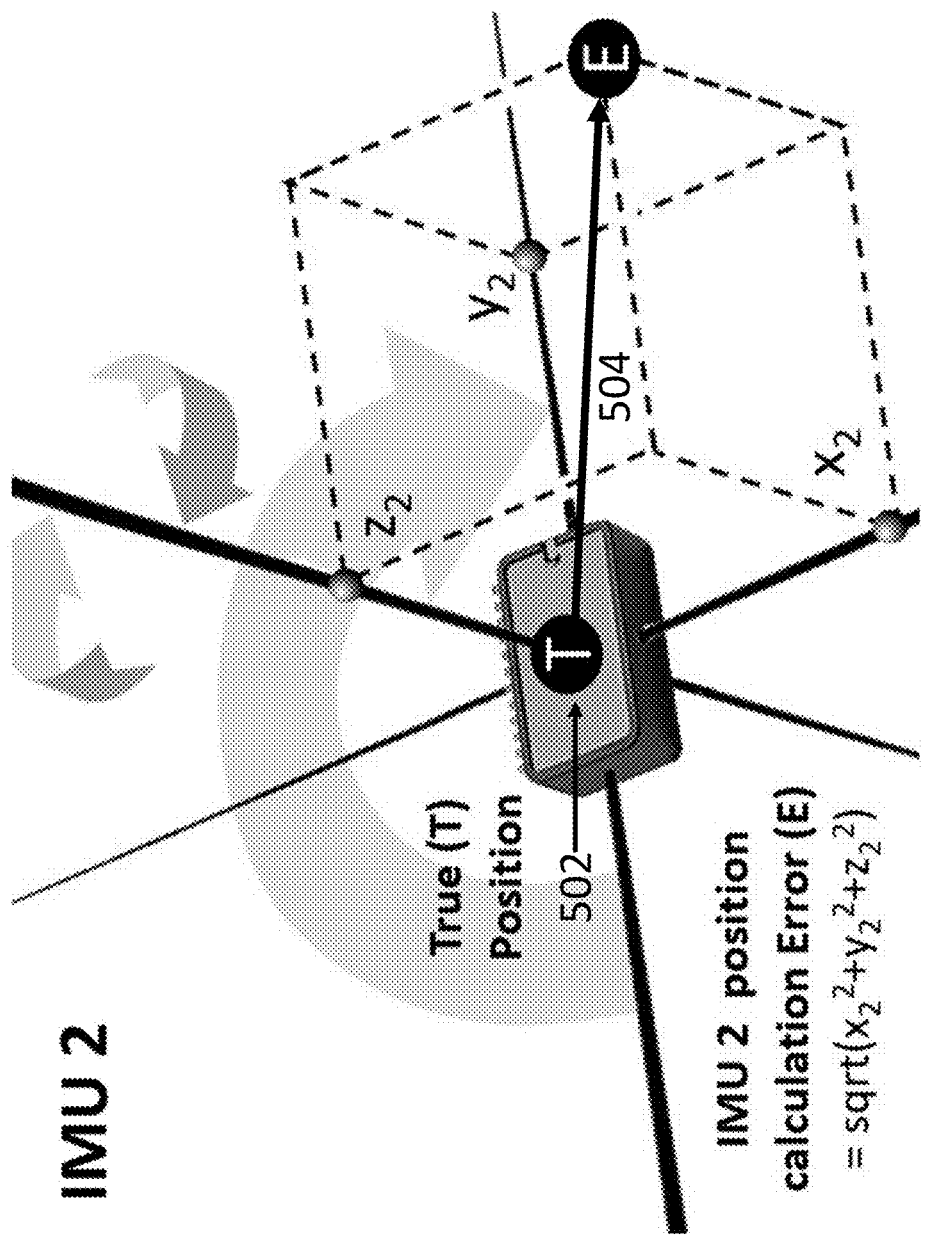
FIG. 5B is an exemplary plot of the error bias of another, oppositely oriented IMU in a pair of IMUs.

FIGS. 5A and 5B illustrate exemplary IMUs 502/512 with an exemplary bias 504. In an exemplary embodiment, the IMUs 502/512 share a position 500, but for illustrative purposes each IMU 502 and 512 is shown in each Figure separately. FIG. 5A illustrates an IMU 502 which may have an exemplary bias condition or error, causing the IMU to reflect a slightly erroneous position 506. The bias may be illustrated as a bias vector 504. FIG. 5B illustrates an IMU 512 with the same bias condition or error 504. However, by rotating the IMU 100 by 180 degrees into the shared x-y plane, the control unit may combine the signals from the IMUs 502/512 and the true position of the device can be identified by cancelling out the bias of the oppositely oriented IMUs 502/512. The control unit may implement parallel processing to integrate the signals from multiple pairs of IMUs.

As a result of the opposed pairs of IMUs, bias, random walk, white noise, gravity, and drift cancellation can all be accounted for by the AI system. In an exemplary embodiment, the body frame of referenced IMU pick-offs may be integrated from a fairly sampled 3-dimensional distribution of unique IMU orientations.

Figure 6:
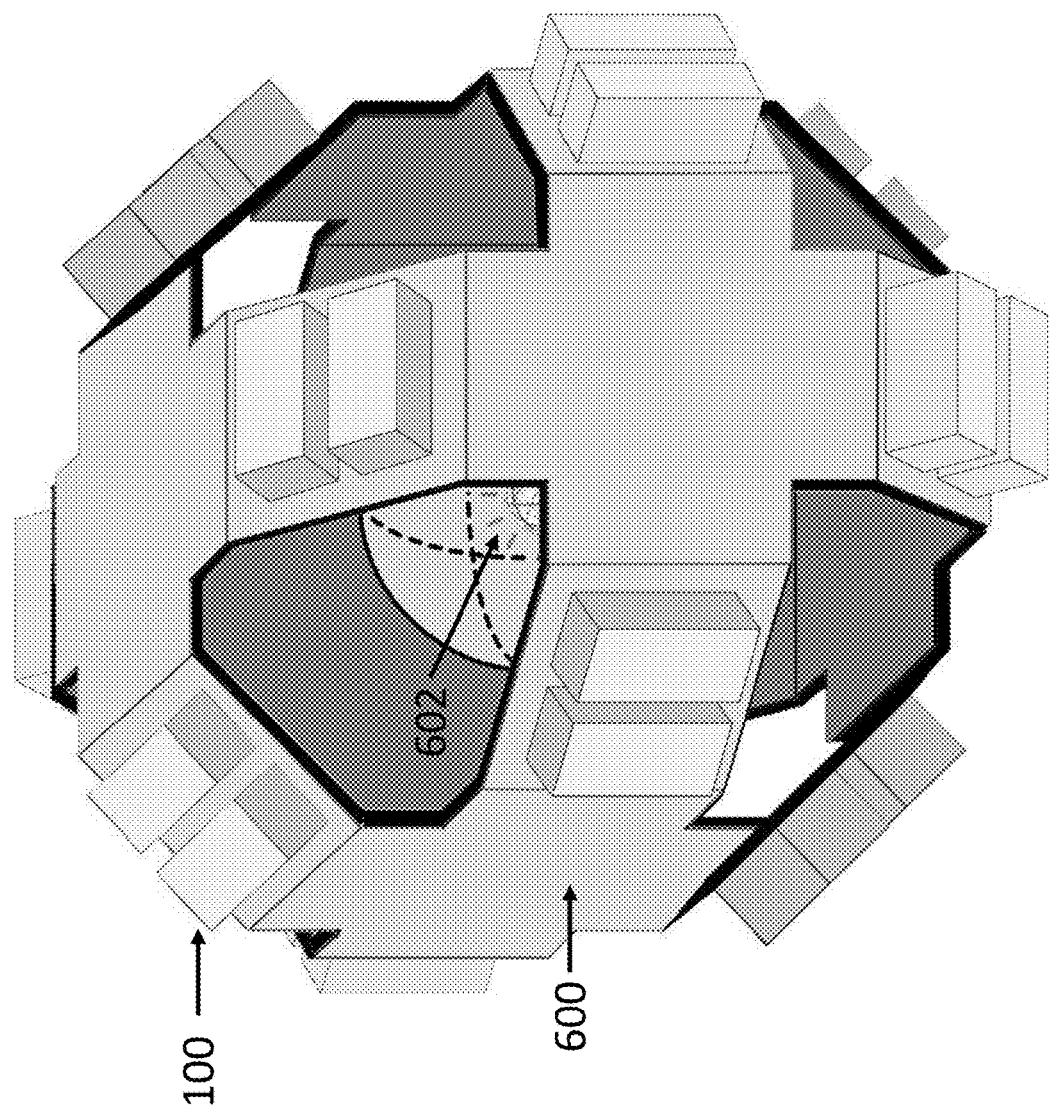
FIG. 6 is an exemplary embodiment of an inertial navigation system with multiple IMUs.

Referring now to FIG. 6, FIG. 6 may illustrate an exploded view of an exemplary embodiment. The example in FIG. 6 illustrates a sphere-like support structure 600 formed from three-interlocking bands ringing a spherical hollow interior. A notional sphere 602 is illustrated at the center of the support structure 600 to illustrate the center point of the exemplary embodiment.

The three bands may circumscribe the notional sphere 602, at the three orthogonal planes, intersecting at the x, y, and z defined origin at the center of the device. The location of the notional sphere may also be the location of the control unit which runs the user-interactive AI. A linear algebra algorithm may integrate rate-gyro and accelerometer pick-offs of multiple IMU pairs. A parallel processor may integrate the raw signals from numerous IMU pairs simultaneously. A cognitive component implementing, for example, fuzzy logic, may detect, diagnose, and compensate for anomalies, such as those due to IMU failures or damage to the device.

An exemplary embodiment may further include an on-board data repository for real-time cognitive analysis of position and orientation calculations between known points. A network interface card may also be included for optional external wireless linkage, such as linkage to an operator or to another positioning device.

Figure 7:
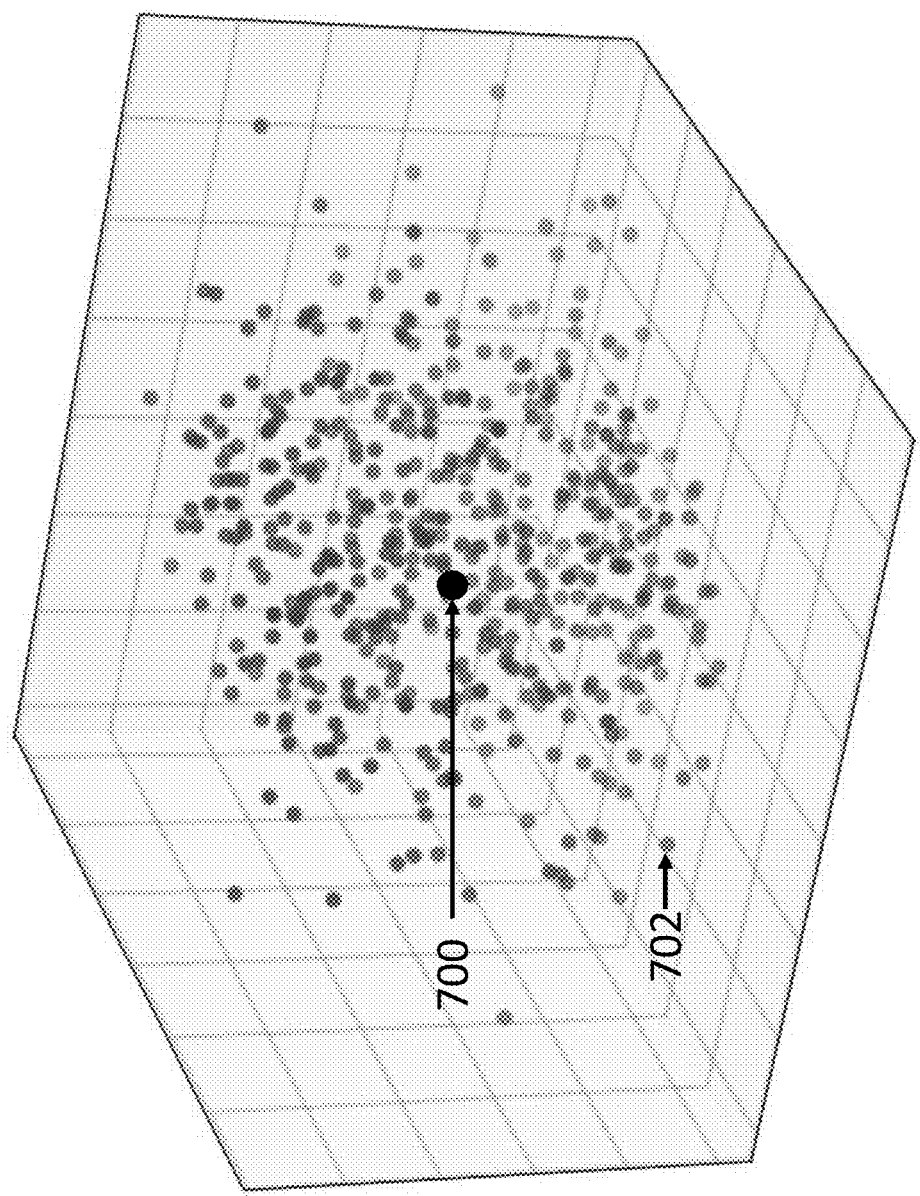
FIG. 7 is an exemplary 3-dimensional plot of measured positions from multiple IMUs.

Referring now to FIG. 7, FIG. 7 may illustrate an exemplary plot of position calculations from multiple IMUs. An exemplary embodiment may calculate a position 700 based on an average or centroid of the reported positions from the multiple IMUs 702. Implementing a greater number of IMUs may increase the accuracy of an exemplary embodiment.

Figure 8:
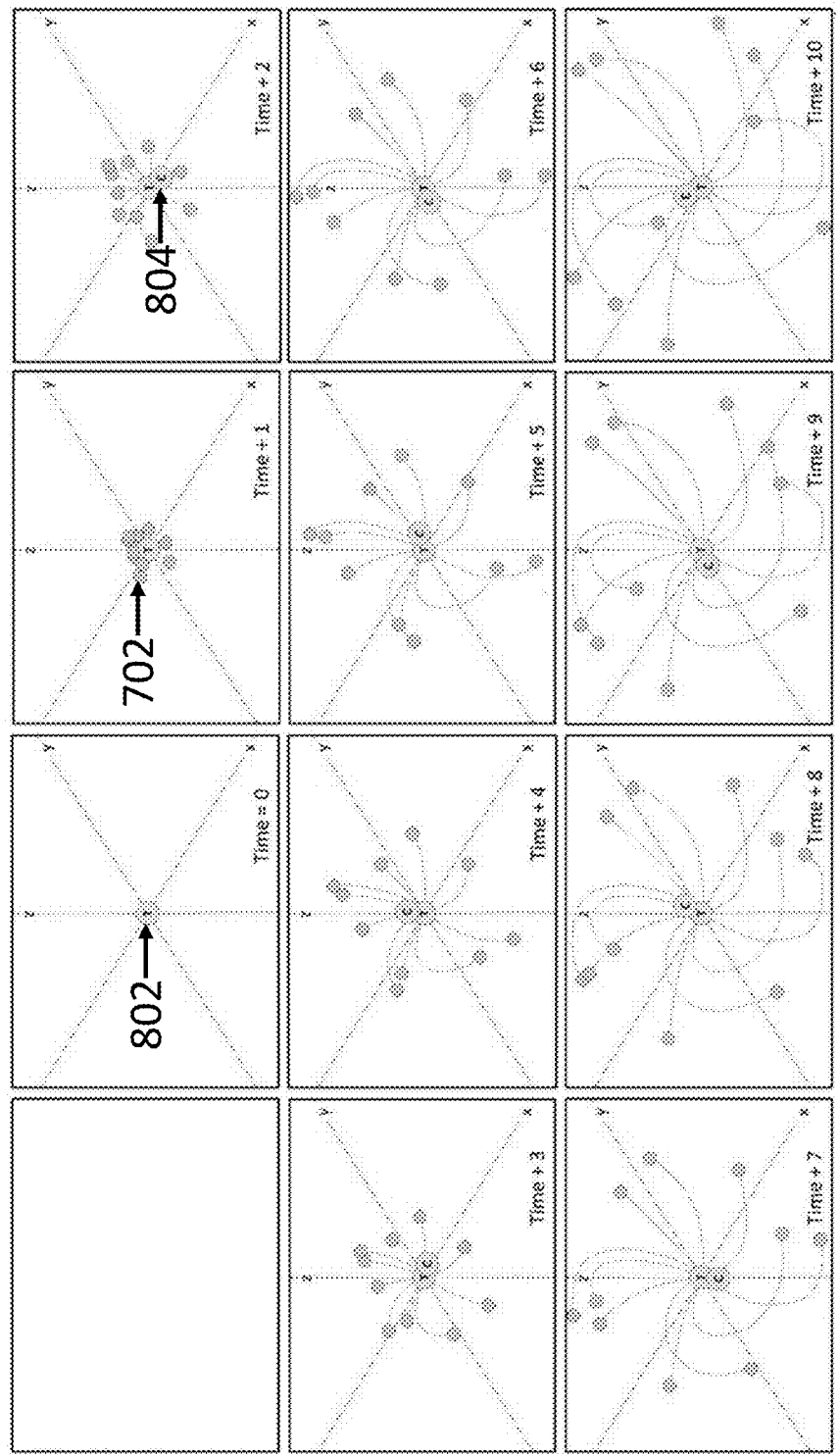
FIG. 8 is an exemplary schematic flowchart illustrating the error over time of individual IMUs versus the calculated position of an exemplary platform.

FIG. 8 illustrates an exemplary schematic flowchart illustrating the reported positions 702 of multiple IMUs in relation to the true position of the platform 802 and the calculated position of the platform 804. An exemplary embodiment may be initialized at a known 3-dimensional location, identified as the true position 802. After initialization, the erred calculation of an individual IMU's position and orientation may continuously grow. The error position of multiple IMUs fixed to the same platform may be illustrated as a cluster which expands over time. An exemplary embodiment may pick off the instantaneous signals of the IMUs periodically, and then may employ linear algebra and parallel processing to quickly calculate the centroid of the expanding cluster. Since the IMUs are evenly distributed in pairs, an accurate position 804 can be identified by cancelling out unwanted bias. An exemplary embodiment may continuously calculate the centroid 804 of the cluster, thus significantly reducing the error over time.

Figure 9:
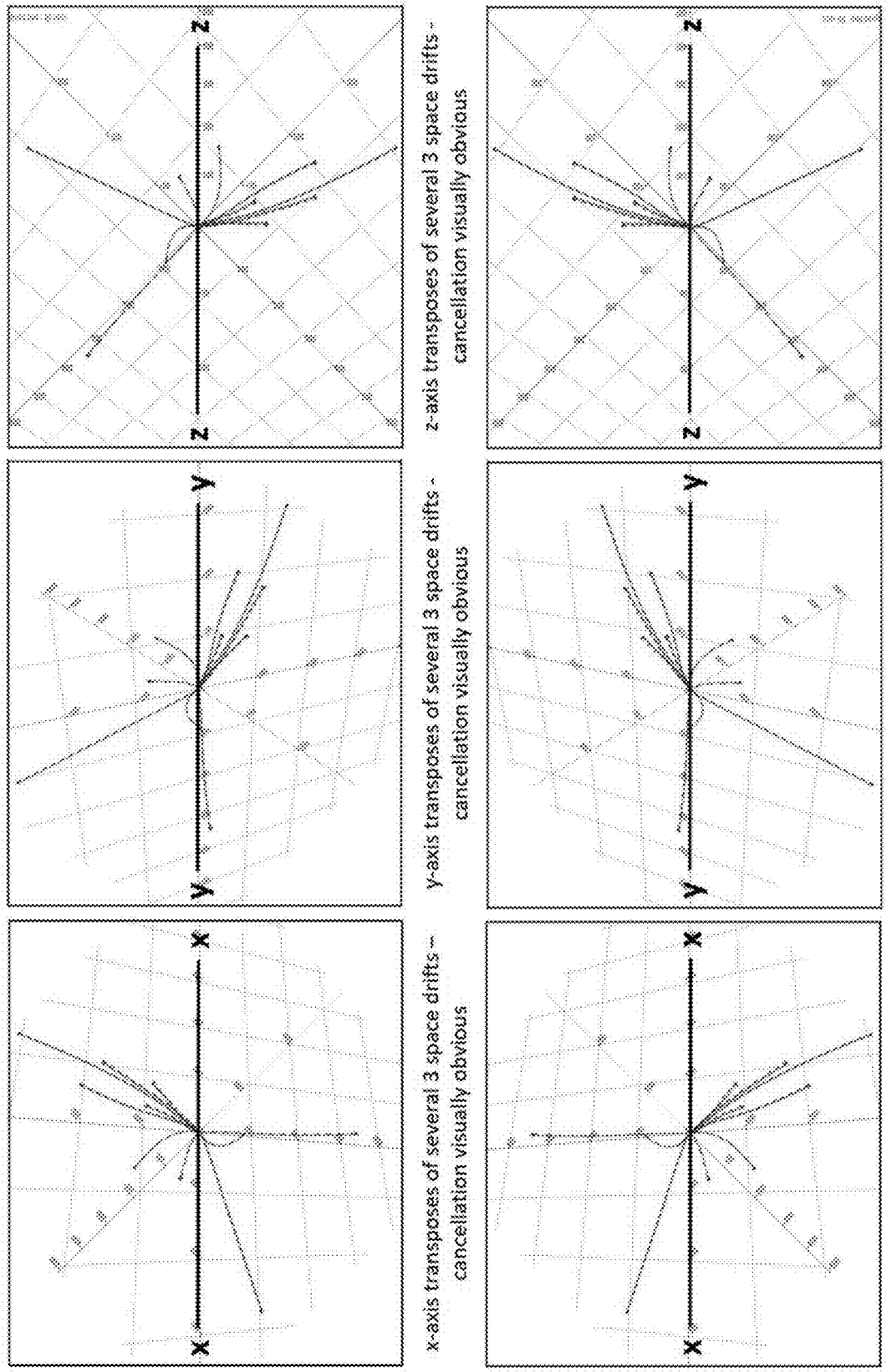
FIG. 9 is an exemplary schematic illustrating multiple plots of several 3-dimensional drifts transposed over the x, y, and z axes.

The exemplary plots in FIG. 9 may illustrate the cancellation of several 3-dimensional drifts. As shown in FIG. 9, the transposed 3-dimensional drift may be reflected, and thus canceled, across the x, y, and z axis.

In an exemplary embodiment, each pair of IMUs may undergo preprocessing to average the two IMU calculations into a single output with the error canceled. This may decrease the computational load on the control unit. Alternatively, each IMU may input raw measurements directly into the control unit which can process the data in parallel. This may lower the latency and increase the speed by calculating the position in a single step, as opposed to the control unit waiting for the IMU pairs to synthesize their data.

Figure 10:
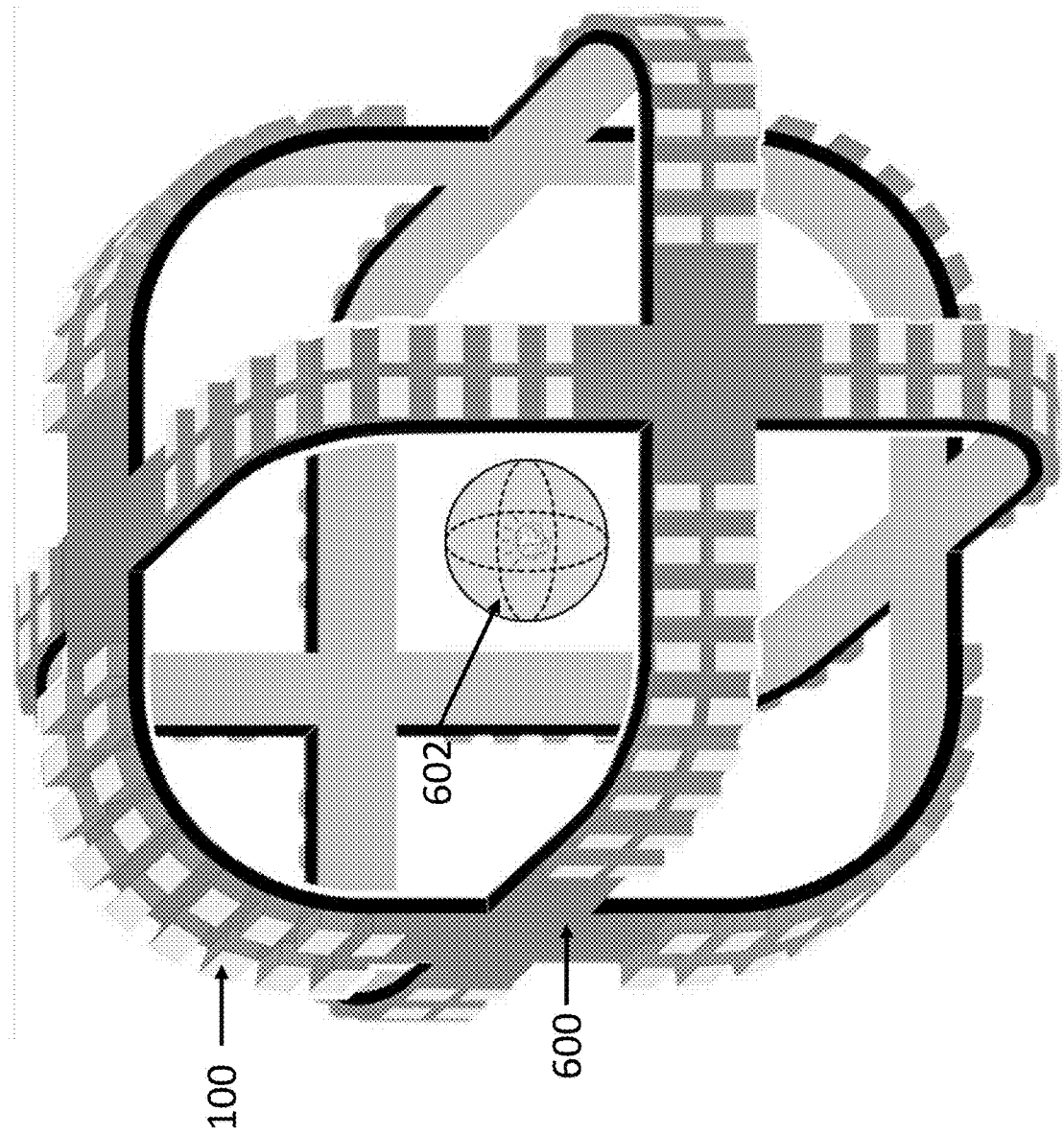
FIG. 10 is an exemplary embodiment of an inertial navigation system with multiple IMUs.

An exemplary embodiment may be configured in multiple ways. For example, an embodiment may implement a rounded support surface 600 as shown in FIG. 10A, with evenly distributed IMUs across the three bands. The support surface 600 may be assembled around a center point 602. The control unit may be located at the center point. As shown in FIG. 11, any support surface may be implemented such as a closed sphere 1102, a torus 1104, an ellipsoid 1106, or a triangular pyramid 1108.

Another exemplary embodiment may implement multiple IMUs in a spiral, as shown in FIG. 12. The spiral may provide a compact design and may simplify manufacturing. As shown in FIG. 12, an exemplary embodiment may implement three spirals, where the IMUs 100 in each of the three spirals 1200 are oriented in orthogonal planes although the spirals 1200 themselves are parallel to one another. An exemplary embodiment may further include layers between planes to house the control unit as well as layers for heat management.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for inertial navigation, comprising:
   a plurality of inertial measurement units, each inertial measurement unit in the plurality of inertial measurement units comprising a plurality of sensors;
   three looped bands, each band comprising a plurality of oppositely-oriented pairs of the inertial measurement units fixed to the looped bands, an internal area defined within the three looped bands; and
   a control unit configured to:
   receive signals from the inertial measurement units provided on the three looped bands;
   calculate a position based on the signals, said position comprising an average position or centroid position provided in the internal area; and
   perform inertial navigation based on the position.

2. The system for inertial navigation of claim 1, wherein the looped bands are circular and the inertial measurement units form a sphere across the three bands.

3. The system for inertial navigation of claim 1, wherein the plurality of inertial measurement units are selected from a single manufacturer.

4. The system for inertial navigation of claim 1, wherein the plurality of inertial measurement units are selected from a same lot, wherein the same lot comprises a single batch of inertial measurement units produced together under similar conditions.

5. The system for inertial navigation of claim 1, wherein each of the plurality of inertial measurement units further comprises an error bias, wherein each one of the plurality of inertial measurement units comprises an identical error bias.

6. The system for inertial navigation of claim 1, wherein each of the three looped bands comprises an equal quantity of inertial measurement units.

7. The system for inertial navigation of claim 1, wherein each of the inertial measurement units are micromechanical electronic inertial measurement units.

8. The system for inertial navigation of claim 1, wherein the control unit is configured to receive a plurality of signals from each of the inertial measurement units, and configured to integrate, via an artificial intelligence, the signals into a calculated position.

9. The system for inertial navigation of claim 8, wherein the artificial intelligence identifies the centroid position based the received signals.

10. The system for inertial navigation of claim 8, wherein each oppositely-oriented pair of inertial measurement units calculates a combined signal which is sent to the control unit, wherein the control unit receives combined signals from a plurality of pairs of inertial measurement units.

11. The system for inertial navigation of claim 1, wherein the looped bands form spirals, wherein the loops are parallel to one another and the inertial measurement units on each of the three loops are oriented in three orthogonal planes.

12. The system for inertial navigation of claim 1, wherein each of the looped bands circumscribes one of three mutually orthogonal planes enclosing a hollow void housing the control unit.

* * * * *